No. 864,770. PATENTED SEPT. 3, 1907.
J. E. CARROLL.
COMPUTING MACHINE.
APPLICATION FILED MAR. 11, 1907.
2 SHEETS—SHEET 1.
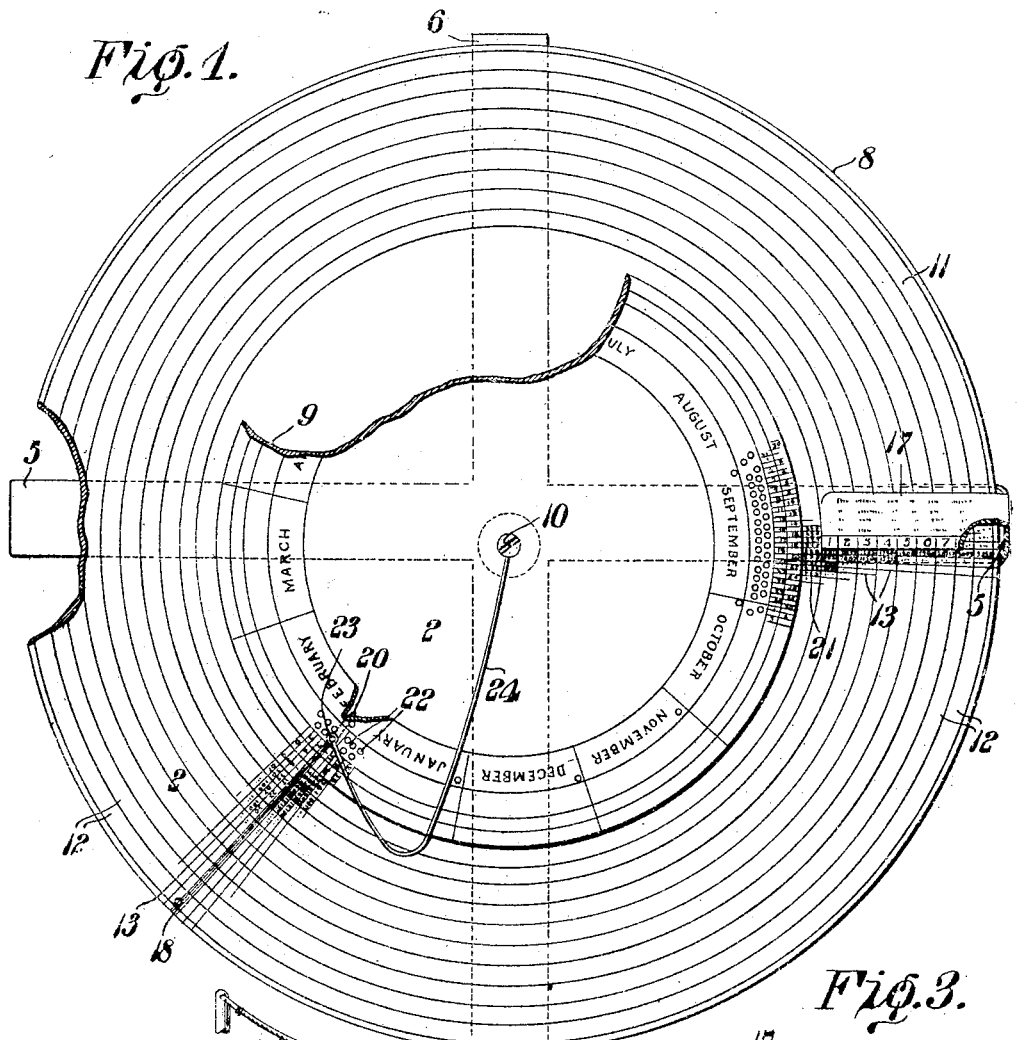
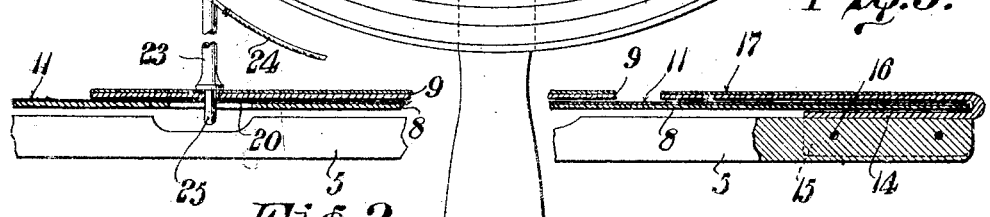
Joseph E. Carroll,
INVENTOR
WITNESSES:
By ATTORNEYS No. 864,770. PATENTED SEPT. 3, 1907.
J. E. CARROLL.
COMPUTING MACHINE.
APPLICATION FILED MAR. 11, 1907.

2 SHEETS—SHEET 2.

WITNESSES:

Joseph E. Carroll, INVENTOR

By C. A. Snow & Co.

ATTORNEYS ic # UNITED STATES PATENT OFFICE.

JOSEPH E. CARROLL, OF PORTSMOUTH, OHIO.

COMPUTING-MACHINE.

No. 864,770.   Specification of Letters Patent.   Patented Sept. 3, 1907.

Application filed March 11, 1907. Serial No. 361,757.

*To all whom it may concern:*

Be it known that I, JOSEPH E. CARROLL, a citizen of the United States, residing at Portsmouth, in the county of Scioto and State of Ohio, have invented a new and useful Computing-Machine, of which the following is a specification.

This invention relates to devices for computing interest and has for its object to provide a comparatively simple and inexpensive device of this character by means of which the amount of interest due on any given principal for any given length of time may be quickly and accurately ascertained.

A further object of the invention is to provide an interest computing device which will give the correct number of days between any two dates and the exact amount of interest due on a given principal between said dates.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

Figure 4:
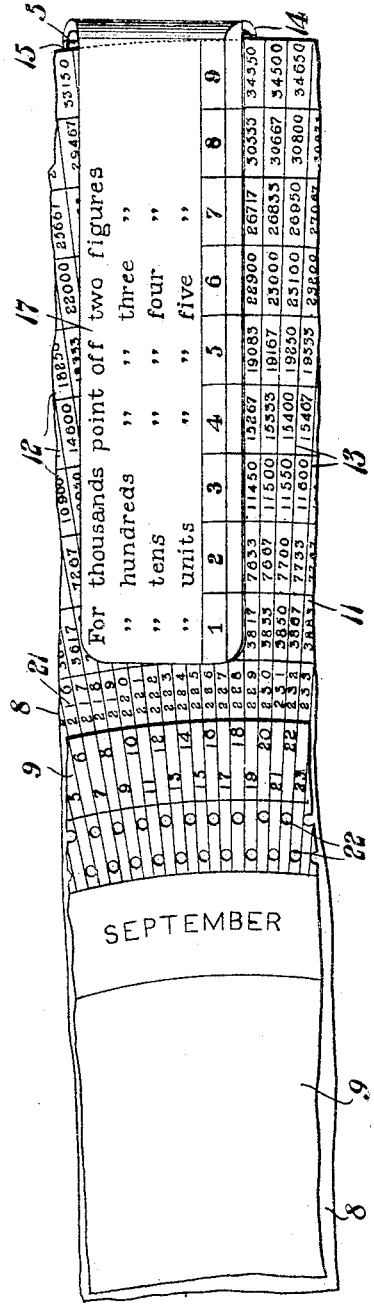
Figure 5:
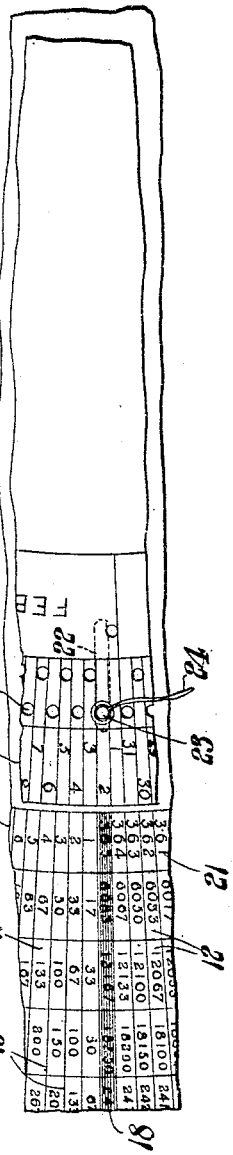

In the accompanying drawings forming a part of this specification: Figure 1 is a plan view partly in section of a computing device constructed in accordance with my invention. Fig. 2 is a transverse sectional view taken on the line 2—2 of Fig. 1. Fig. 3 is a similar view taken on the line 3—3 of Fig. 1. Fig. 4 is a plan view on an enlarged scale of a portion of the coacting dials or disks. Fig. 5 is a similar view of another portion thereof.

Similar numerals of reference indicate corresponding parts in all of the figures of the drawings.

The improved device forming the subject matter of the present invention includes a suitable support preferably consisting of intersecting cross arms 5 and 6 one of which is extended to form a handle 7. Mounted for rotation at the intersection of the arms 5 and 6 are a plurality of concentric disks 8 and 9 one of which constitutes an interest bearing dial and the other a calendar dial, said disks being pivotally connected with the supporting arms in any suitable manner as by a screw, rivet or similar fastening device 10.

Stamped, printed or otherwise represented on the face of the disk 8 is a dial or plate 11 bearing a plurality of concentric circles forming a series of concentric rows 12 between which are arranged a plurality of numerals indicating the interest on different amounts at the rate of six percent per annum, the concentric circles on the face of the dial being intersected by a plurality of radiating lines 13 so that the interest products on different amounts for the same period will be disposed in alinement.

Secured to one end of the cross arm 5 is a metal plate 14 having depending flanges 15 which embrace the adjacent longitudinal edges of the cross arm 5 and are secured thereto in any suitable manner as by bolts or screws 16. The free end of the plate 14 is bent upwardly and laterally to form a rule or pointer 17 which overhangs the disk 8 and is adapted to register with any one of the radial lines 13 when the disk 8 is rotated thereby to transversely aline the adjacent numerals in the several concentric rows so that the interest on any particular principal or amount may be readily read on the dial.

Stamped or otherwise printed on the upper face of the arm 17 are a series of numerals corresponding to the number of rows of numerals on the face of the disk 8, said numerals being arranged in progressively increasing decimal notation and indicating the principal or amount on which the interest is to be calculated.

The numeral 1, indicates the values 10, 100 and 1000, the numeral 2; 20, 200 and 2000, the numeral 3; 30, 300 and 3000 and so on throughout the entire series of numerals on the pointer or rule. The disk 8 is stamped, printed or otherwise formed with a prominent designating segment 18 indicating zero and extending through the disk and disposed in alinement with the zero mark 18 is a longitudinal slot 20 for the purpose hereinafter referred to.

Disposed concentric with the disk 8 and arranged within the inmost concentric circle of the interest bearing field is another circle, and printed, stamped or otherwise represented on the face of the dial 8 within the confines of said circle are a plurality of numerals 21, indicating the number of days in the year, the first day of the year being represented by the numeral 1 on one side of the zero mark 18 and the numeral 365 being printed on the dial on the opposite side of said line and indicating the last day of the year.

The radial lines 13 intersect the date bearing circle so that the interest products on any given amount at 6% will appear opposite each day.

The calendar bearing disk 9 is printed or otherwise stamped with the names of the different months in the year and also the number of days in each month. Suitable perforations or openings 22 are formed in the disk 9 and arranged in alinement with the numerals indicating the days of the month, as shown, there being radial lines separating the several numerals indicating the days of the month and adapted to register with the radial lines on the disk 8. The perforation or opening indicating the first day of each month is preferably arranged to one side, or in advance, of the remaining openings or perforations so that the operator may readily determine the division lines on the dial between the several months in the year.

As a means for operating or rotating the several disks there is provided a pin or needle 23 having its upper end connected by a cord or other flexible medium 24 with the pivot pin or screw 10, the opposite end of the needle being reduced to form a point 25 adapted to enter the opening or perforations in the calendar bearing disk and also the elongated slot 20 in the interest bearing disk.

When it is desired to compute the interest on any desired amount, for instance, $7168 at 6% from February 2nd to September 19th, the calculator is supported in the hand by grasping the handle 7 after which the pointer 22 is inserted in the opening or perforation opposite the numeral 2 on the February section of the calendar disk and said disk rotated until the point of the needle enters the elongated slot 20 in the dial 8 after which the two dials are rotated in either direction until the numeral 19 of the September section registers with the lower edge of the pointer or rule 17. By referring now to the rule or pointer it will be observed that the numerals on the interest bearing disk 8 immediately below the number 7 on the pointer will show $267.17 which indicates the amount of interest at 6% on $7000 for 229 days. Below the numeral 1 will appear $3.817 the amount of interest due on $100, below the numeral 6 will appear $2.29 representing the interest on $60, and below the numeral 8 will appear .305 or .31 indicating the interest on $8, these figures added together amounting to $273.59, the interest due on $7168 for 229 days namely, from February 2nd to September the 19th, the number of days on which the interest is computed being ascertained by reference to that numeral on the inner concentric circle 21 which is in alinement with the adjacent transverse row of interest products.

While the numerals on the disk represent the rate of interest at 6% on any given amount, the device may be used for computing interest at any other rate with equally good results, for instance, if it is desired to find the interest due on $7168 from February 2nd to September 19 at 2% the mode of procedure is the same as for 6% the only difference being that after the interest at 6% is determined two-thirds of the result is subtracted from this amount. To find the interest at 3% one-half of the amount is deducted, 4% one-third, 5% one-sixth, 7% one-sixth is added to the result, 8% one-third, and 9% one-half.

For convenience in manipulation, the computing disks are preferably mounted on intersecting supporting arms, as shown, but it will of course be understood that the invention is not limited to this particular form of support as the disks may be suspended from a wall, supported on an easel, arranged to lie flat on a desk or supported in any other suitable manner without departing from the spirit of the invention.

Having thus described the invention what is claimed is:

1. A computing device including a plurality of superposed rotary disks one of which is formed with an elongated slot and provided with a plurality of rows of numerals representing the interest on different amounts for a pre-determined period at a given rate percent, the other disk being provided with date spaces and having perforations formed therein opposite each date space, there being a designating segment on the interest bearing disk and disposed in alinement with the slot, a pointer bearing numerals in progressively increasing decimal notation indicating the several amounts on which the interest is to be calculated, and an operating device adapted to enter the perforations in the date bearing disk for rotating said disk thereby to aline any particular date space with the designating segment.

2. A computing device including a support, a plurality of superposed disks mounted for rotation on the support one of said disks being provided with an elongated slot and having a plurality of rows of numerals representing the interest on different amounts for a pre-determined period at a given rate percent, and the opposite disk being provided with date spaces and having perforations formed therein opposite each date space, a pointer carried by the support and bearing numerals indicating the several amounts on which the interest is calculated, and an operating device adapted to enter the perforations in the adjacent disk and also the slot in the opposite disk for rotating both disks thereby to aline the several rows of interest products with the pointer.

3. A computing device including a support, a plurality of superposed disks mounted for rotation on the support, one of said disks being provided with an elongated slot and the other with a series of perforations adapted to register with the slot, a pointer secured to the support and overhanging one of the disks, and an operating device adapted to engage the slot and the adjacent perforation for rotating said disks.

4. A computing device including a support, a plurality of disks mounted for independent rotation on said support, the lower disk being provided with an elongated slot and bearing a plurality of numerals representing the interest on the different amounts for a pre-determined period at a given rate percent, there being a concentric row of numerals on said disk and indicating the number of days in the year, the upper disk being provided with a plurality of date spaces adapted to register with the interest products and the concentric row of numerals, there being perforations formed in the upper disk and indicating the number of days in each month, a pointer secured to the support and bearing numerals indicating the several amounts on which the interest is calculated, and an operating device adapted to engage the perforations in the upper disk and the slot in the lower disk for rotating said disks.

In testimony that I claim the foregoing as my own, I have hereto affixed my signature in the presence of two witnesses.

JOSEPH E. CARROLL

Witnesses:
EDGAR G. MILLAR,
JOSEPH W. MITCHELL.